Aug. 24, 1943.  R. KNOX, JR  2,327,907
APPARATUS FOR MUSICAL INSTRUCTION
Filed April 6, 1942
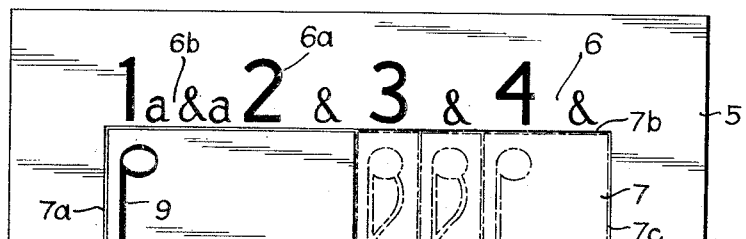
FIG. 1.
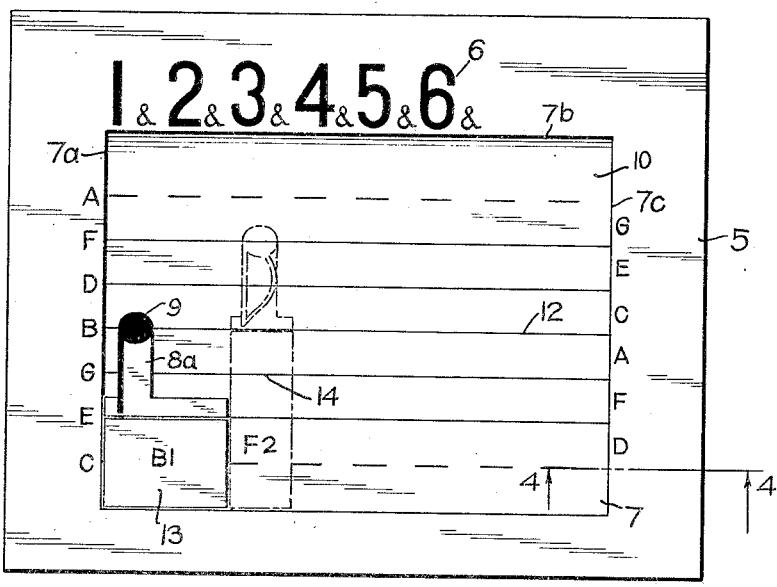
FIG. 2.
FIG. 3.
FIG. 4.
RALPH KNOX, JR.
INVENTOR.

Patented Aug. 24, 1943

2,327,907

UNITED STATES PATENT OFFICE 2,327,907

APPARATUS FOR MUSICAL INSTRUCTION

Ralph Knox, Jr., Denver, Colo.

Application April 6, 1942, Serial No. 437,741

10 Claims. (Cl. 84—472)

This invention relates to music instruction, particularly of an elementary nature and more specifically relates to devices for visibly indicating time or rhythm in music, with or without the inclusion of pitch.

It is an object of the present invention to provide a means of visibly representing selective variations in rhythm, or pitch, or both; which means may be produced on a scale suited for either class or individual instruction.

Another object of the invention is the provision of means for properly locating visible musical symbols in correct interrelation to graphically represent a prescribed rhythm.

Other objects reside in novel details of construction and novel combinations and arrangements of parts, all of which will appear more fully in the course of the following description.

To afford a better understanding of the practice of the invention, reference will be made to the accompanying drawing illustrating typical embodiments, and in the drawing in the several views of which like parts have been designated similarly, Figure 1 is a plan view of a preferred form of the invention with the intended position of certain parts shown in dotted lines;

Figure 2 is a plan view of a modified form of the invention;

Figure 3 is a view of another embodiment of the invention showing certain parts in plan and certain parts in perspective; and Figure 4 is a section taken along the line 4—4 of Figure 2.

Referring first to the form illustrated in Figure 1, reference numeral 5 indicates a measure form, provided with a visible scale 6 displaying the counts 6a and sub-counts 6b of a musical measure. A cut-out portion or recess 7 adjoins the scale 6 and is the same length to provide boundaries in the form of edges 7a, 7b and 7c for a series of interchangeable insert pieces 8, each of which bears a musical symbol 9.

The pieces 8 are made in a variety of lengths based on a unit which is the length of a count or sub-count in a scale 6 as preferred, and the pieces 8 are made in a progression of lengths including each multiple of the unit, to and inclusive of the total of such units appearing on the scale 6.

For example, where the scale 6 of the measure form is 4/4 time, the cut-out portion may be eight inches in length, the distance between the numerals on the scale in such case is two inches, and the distance to the "&" sign is one inch, while the distance from a numeral to the "a" is one-half inch.

With such an arrangement, it is possible to construct any desired musical rhythm and each note will fall into proper position under the count designation of the scale. It will be understood that the dimensions stated are merely illustrative and the unit dimension may be varied at will to satisfy any given requirement. Likewise, while 4/4 time has been illustrated in the scale 6 of Figure 1, it will be readily apparent that any musical time may be similarly displayed.

The measure form 5 and the insert pieces 8 may be made of any suitable materials, such as pasteboard, plastic, wood or metal and preferably are made of pasteboard with the scale 6 and symbols 9 printed thereon.

The primary purpose of the measure form and insert pieces is to teach music students by visual instruction how to count music time. As the length of the individual piece 8 selected for insertion in space 7 determines the count by reference to the units of scale 6, there is no possibility of error in determining the count once there has been a proper selection of the individual pieces for insertion in recess 7, as the position of the piece on the scale prescribes the count.

The form of the invention illustrated in Figure 2 incorporates additional instruction features with the features hereinbefore described. In this form, the measure form 5 has its scale 6 in superposed relation to the recess 7, and a backing member 10 bears a music staff 12 consisting of lines and spaces designating note positions in the musical scale.

Adjoining the edge on one side recess 7 is a tabulation of note designations for each line in the staff 12, while adjoining the opposite edge of recess 7 there is another tabulation of note designations for each space in staff 12.

The individual pieces 8a in this form of the invention while being in a variety of lengths in units of the measure scale length, are also produced in a variety of widths in the transverse dimension to locate the note symbol 9 thereof on the proper line or space of staff 12. Likewise, if preferred, the width may be uniform and variation in width of the spacers 13 will determine the note position for proper pitch.

The pieces 8a in this form are not rectangular but employ a cut-out arrangement as illustrated in Figure 2, to permit association of the note symbols 9 with a given line or space of staff 12 which is readily visible. To illustrate the variety of rhythms that may be employed in the use of the present invention, the scale 6 of Figure 2 is in 6/8 time.

The arrangement illustrated in Figure 2 includes the use of spacer members 13 which are placed under the note symbols 9 of pieces 8 and serve to elevate them to the proper position on the musical staff 12. Where the spacers 13 are of such dimension that they would obscure a substantial part of the lines of staff 12, corresponding lines 14 are placed on the face of such spacers, as illustrated in Figure 2.

These spacers 13 vary in width in units of the musical staff 12 and include a range of sizes to and inclusive of an octave spacer. Preferably, every pitch spacer has the proper letter on it, or other symbolic designation, so that the predetermined pitch may be quickly selected by visual inspection.

The form of the invention illustrated in Figure 3 represents a modification of the emodbiment of the invention illustrated in Figure 2. In this form, the number 5 has a rectangular outline or recess 7 and the scale 6 is positioned coextensive with a long side of the outline and in proximity thereto.

A cover member 15 in the form of a transparent sheet or strip is mounted on the member 5 for movement into covering relation to outline 7 and bears on its face a music staff 12 arranged to register with outline 7 when the strip is in covering relation thereto. The individual pieces used with this form of the invention may be rectangular, as indicated by the reference numeral 8 in Figure 1, rather than cut-out as indicated by the reference numeral 8a in Figure 2, as the staff is superposed upon the pieces and the relationship is readily apparent due to the transparency of the sheet 15.

In this form, the pieces 8 are made again in variable lengths, and in widths which are multiples of the spacing unit of the music staff 12, and such pieces may be used in conjunction with spacer members 13 of variable sizes in multiples of the music staff unit, as explained in the description of the arrangement illustrated in Figure 2.

From the foregoing description, it will be observed that all the illustrated embodiments use the primary relationship of scale, outline enclosure and pieces of predetermined length to visibly indicate the proper count to be applied to the symbol appearing on any given piece. When it is desired to combine the elements of rhythm and pitch in the musical instruction, the forms illustrated in Figures 2 and 3 will be employed, but these forms also embody the essential elements of the arrangement illustrated in Figure 1.

Thus it is apparent that the present invention affords an expeditious means for musical instruction and one which substantially eliminates the usual errors of the pupil encountered in such instruction, namely, the correct association of the counts of music and the notes.

Where it is desired to employ the invention for class instruction, the measure form 5 and insert pieces 8 may be made on a scale permitting its display from a wall of the room where it will be readily visible to all members of the class. In such case, it will be necessary to provide some fastening means for the pieces as by thumbtacks, unless the lower edge of recess 7 is extended sufficiently to provide a rest for the individual pieces 8.

If desired, each pupil may be provided with duplicate equipment on a small scale in order that the manipulations of the instructor may be repeated by the pupil as performed.

Where the term "musical symbol" is employed in the description and claims, it is intended to designate both notes and rests, which may be placed on opposite faces of the same piece, if desired.

While in the forms illustrated in the drawing, the scale 6 has been made coextensive with the long side of the rectangle, it will be apparent that for certain purposes the staff might be placed upon the long side and the scale 6 in such event would be located along a short side of such enclosure.

Other uses and arrangements within the spirit and scope of the invention will be apparent to those skilled in the art, and changes and modifications may be availed of within the spirit and scope of the invention as defined in the hereunto appended claims.

What I claim and desire to secure by Letters Patent is:

1. Apparatus of the character described, comprising a member having portions forming an edged enclosure, a scale on said member adjoining said enclosure divided into units of a musical measure, and a plurality of pieces of different lengths arranged for interchangeable insertion in said enclosure in register with the rim thereof, each piece bearing a musical symbol on its face and being of a length corresponding to the multiple of the scale unit coinciding with the musical symbol it bears, and said symbol being so arranged on the piece that it is brought into visible alinement with its proper unit on the scale when the piece is so inserted in the enclosure.

2. Apparatus of the character described, comprising a member having portions forming an edged enclosure, a scale on said member adjoining said enclosure divided into counts and subcounts of a musical measure, and a plurality of pieces of different lengths arranged for interchangeable insertion in said enclosure in register with the rim thereof, each piece bearing a musical symbol on its face and being of a length corresponding to the multiple of the scale unit coinciding with the musical symbol it bears, and said symbol being so arranged on the piece that it is brought into visible alinement with its proper unit on the scale when the piece is so inserted in the enclosure.

3. Apparatus of the character described, comprising a member having a recess forming an edged enclosure, a scale on said member adjoining said enclosure divided into units of a musical measure, and a plurality of pieces of different lengths arranged for interchangeable insertion in said enclosure in register with the rim thereof, each piece bearing a musical symbol on its face and being of a length corresponding to the multiple of the scale unit coinciding with the musical symbol it bears, and said symbol being so arranged on the piece that it is brought into visible alinement with its proper unit on the scale when the piece is so inserted in the enclosure.

4. Apparatus of the character described, comprising a sheet having on one face a rectangular outline, a scale on the sheet coextensive with a long side of the outline and in proximity thereto, said scale including a symbolic designation of the counts and sub-counts of a musical measure, and a plurality of pieces of different lengths arranged for interchangeable insertion with said outline in register with the rim thereof, each piece bearing a musical symbol on its face, and being of a length corresponding to the multiple of the sub-count unit coinciding with the musical symbol it bears, and each symbol being so arranged on the piece that it is brought into visible alinement with its proper unit on the scale when the piece is so inserted in the outline.

5. Apparatus of the character described, comprising a sheet having a rectangular recess, a scale on the sheet coextensive with a long side of the recess and in proximity thereto, said scale including a symbolic designation of the counts and sub-counts of a musical measure, and a plurality of rectangular pieces of different lengths arranged for interchangeable insertion in the recess in register with the rim thereof, each piece bearing a musical symbol on its face and being of a width corresponding to the width of the recess, and a length corresponding to the multiple of the sub-count unit coinciding with the musical symbol it bears, and each symbol being so arranged on the piece that it is brought into visible alinement with its proper unit on the scale when the piece is so inserted in the recess.

6. Apparatus of the character described, comprising a sheet having on one face a rectangular outline, a scale on the sheet coextensive with a long side of the outline and in proximity thereto, said scale having a symbolic designation of units of a musical measure, a music staff within the outline, and a plurality of pieces of different size arranged for interchangeable insertion within said outline in register with the rim thereof, each piece having a projected portion bearing a note symbol on its face, the length of said pieces corresponding to the multiple of the scale unit coinciding with the musical symbol it bears and the width through the projected portion corresponding to the multiple of the music staff unit of spacing coinciding with the note symbol it bears to position said note on its proper line or space in the staff when such piece is seated within the outline enclosure, and each symbol being so arranged on the piece that it is brought into visible alinement with its proper unit on the scale when the piece is so inserted in the outline.

7. Apparatus of the character described, comprising a sheet having on one face a rectangular outline, a scale on the sheet coextensive with a long side of the outline and in proximity thereto, said scale having a symbolic designation of units of a musical measure, a transparent strip mounted on the sheet for movement into an outline-covering position and bearing a music staff arranged thereon to register with the outline when the strip is in said covering position, and a plurality of pieces of different size arranged for interchangeable insertion within said outline, each piece bearing a note symbol on its face and being of a length corresponding to the multiple of the scale unit coinciding with the musical symbol it bears and being of a width corresponding to the multiple of the music staff unit of spacing coinciding with the note symbol it bears to position said note in register with the proper line or space of the staff when such piece is seated within the outline enclosure and covered by the strip.

8. In apparatus of the character described, a member having a substantially flat surface bearing an edged enclosure, a scale in proximity to one side of said enclosure and coextensive therewith, said scale having a symbolic designation of units of a musical measure, a music staff within said enclosure, and a plurality of substantially L-shaped pieces arranged for interchangeable insertion within said enclosure, each piece bearing a note symbol on the upstanding part of the L contour, whereby such symbol is placed in visible association with a line or space of the music staff.

9. In apparatus of the character described, a member having a substantially flat surface bearing an edged enclosure, a scale in proximity to one side of said enclosure and coextensive therewith, said scale having a symbolic designation of units of a musical measure, a music staff within said enclosure, a plurality of pieces of different widths arranged for interchangeable insertion within said enclosure, each piece bearing indicia of a musical note and being of a width corresponding to the multiple of the music staff unit of spacing coinciding with its note designation, and a substantially L-shaped piece bearing a musical note symbol adapted to adjoin one of said other pieces seated on the lower side of the enclosure, to position said note symbol on the line or space of the music staff coinciding with the indicia designation of the other piece.

10. Apparatus of the character described, comprising a flat member, a scale displayed on said member and including a symbolic designation of the counts and sub-counts of a musical measure, a piece-receiving enclosure juxtaposed on the member in coextensive relation to said scale, and a plurality of pieces of different lengths arranged for interchangeable insertion in the enclosure, the lengths of said pieces varying in units corresponding to the unit of the sub-counts and counts of said scale and each piece bearing a musical symbol on its face corresponding to the number of units in its length with the symbol so arranged on the piece that it is brought into visible alinement with its proper unit symbol on the scale when the piece is so inserted in the outline.

RALPH KNOX, Jr.